United States Patent [19]
Sterner et al.

[11] 3,971,339
[45] July 27, 1976

[54] FEEDING SYSTEM

[76] Inventors: Erik Sterner, Tomtegatan 9, 331 00 Varnamo; Elving Nilsson, Nygatan 7, 440 60 Skarhamn, both of Sweden

[22] Filed: Jan. 8, 1974

[21] Appl. No.: 431,754

[52] U.S. Cl. .......................................... 119/52 AF
[51] Int. Cl.² .......................................... A01K 39/00
[58] Field of Search ............... 119/52 AF, 18, 51 R; 198/186, 187, 188, 230, 82–85; 222/406, 407

[56] References Cited
UNITED STATES PATENTS

| | | | |
|---|---|---|---|
| 756,600 | 4/1904 | Dodge | 198/186 |
| 2,302,314 | 11/1942 | Haggart | 119/52 AF |
| 2,597,064 | 5/1952 | Charles et al. | 119/52 AF X |
| 2,693,169 | 11/1954 | Otis | 119/52 AF X |
| 2,833,390 | 5/1958 | Grevlich | 198/187 X |
| 3,636,928 | 1/1972 | Sumner et al. | 119/52 AF |

*Primary Examiner*—Hugh R. Chamblee
*Attorney, Agent, or Firm*—Albert L. Jeffers; Roger M. Rickert

[57] ABSTRACT

The present invention relates to a feeding system for animals and especially a system of the kind intended for feeding poultry in cages which are arranged in rows. The invention also relates to a method of feeding animals. The system provides for discharging feed from a supply, conveying substantially the whole amount of feed so discharged along a path in such a way that the feed is accessible to the animals over at least a section of the path and returning the whole amount of feed remaining after the passage of the path to the beginning of the path.

9 Claims, 5 Drawing Figures

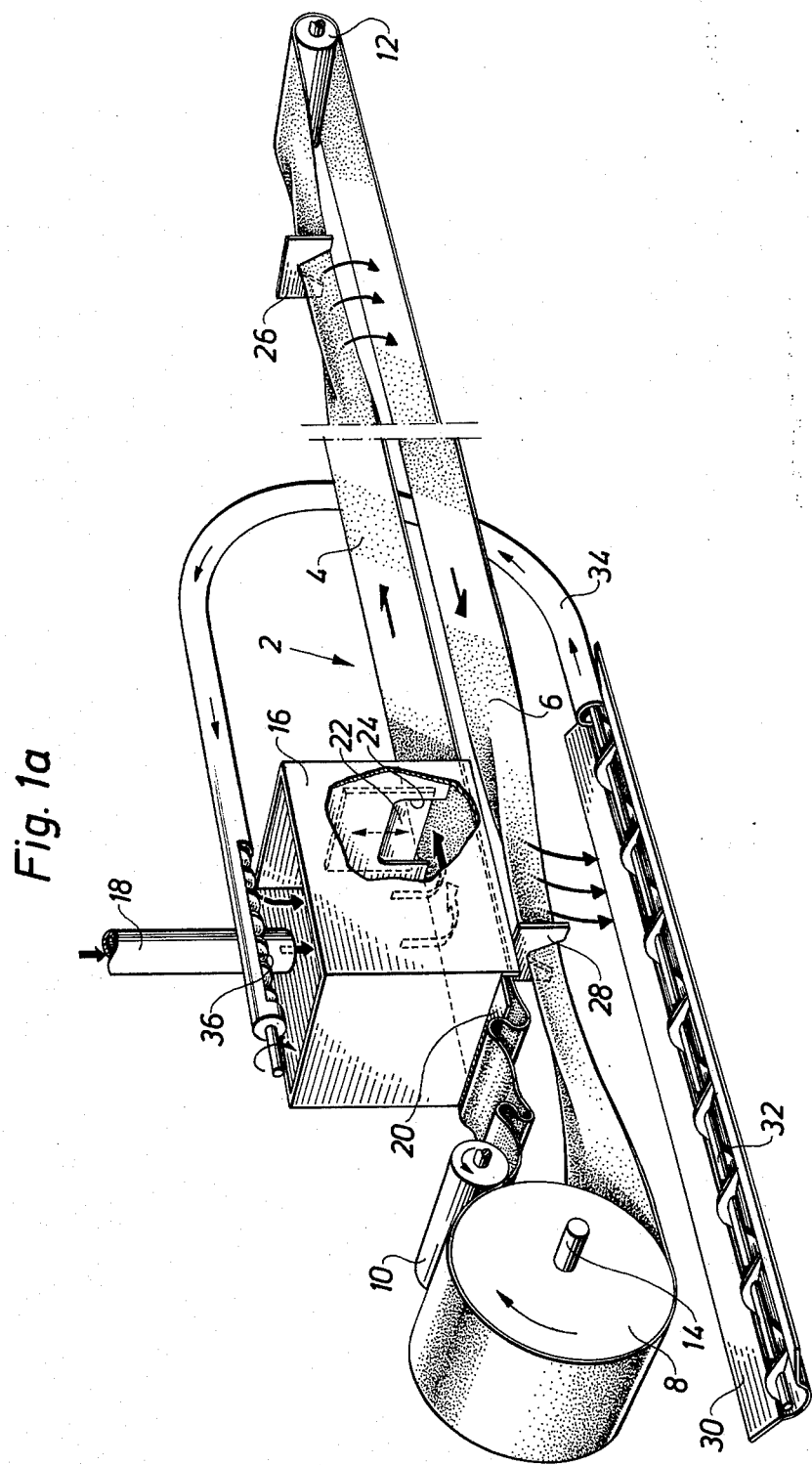

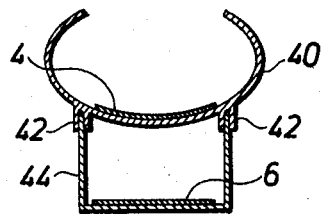
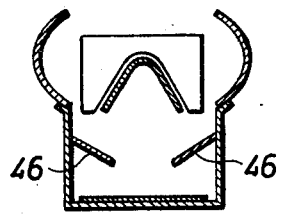
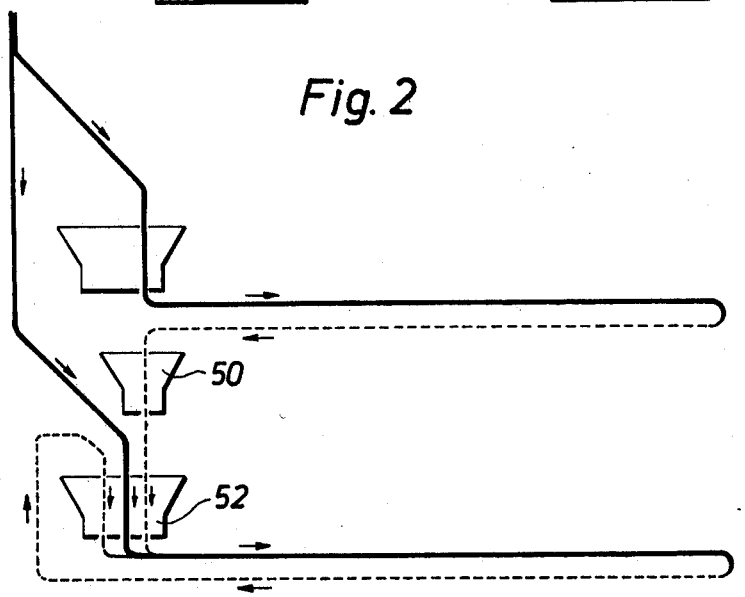
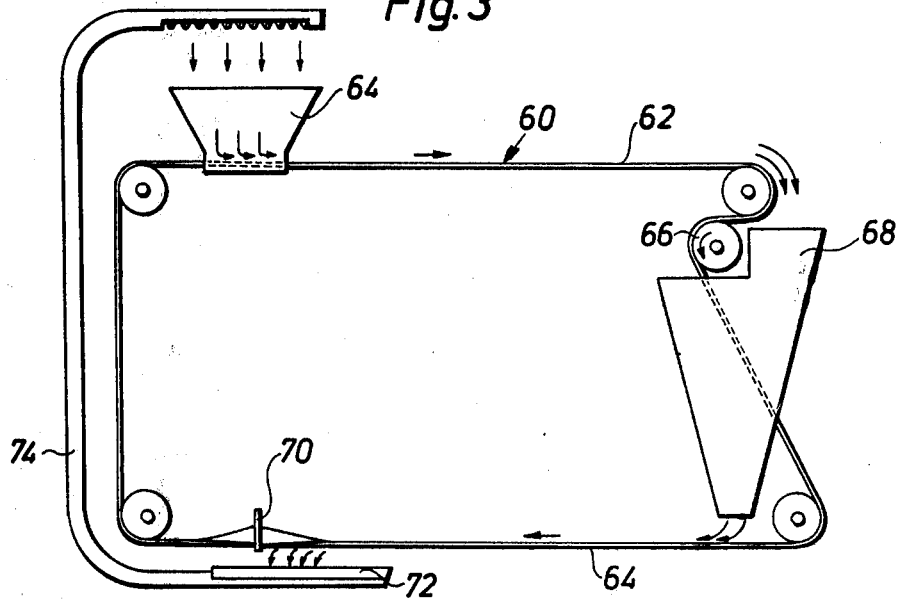

FEEDING SYSTEM

BACKGROUND OF THE INVENTION

A container known feeding system of this kind comprises a feed trough to which the feed is supplied from a feed supply at one or a few points and a distributor device into the distributing the feed supplied to the trough therein. A system of this kind comprises an endless feed trough which extends along the cage rows and consequently has to form a closed system in the horizontal plane. This fact has considerable drawbacks with regard to the possibilities of adapting the system with regard to different requirements. The distributor device working in the trough usually comprises a number of distributor elements displacable in the trough and connected with each other in a closed loop around the whole trough. These distributor elements are expensive as they have to be manufactured from an expensive material, and besides they must be exactly dimensioned in relation to the trough to work in a correct way. Also the operation of the distributor device is complicated and must be performed by means of complicated and expensive arrangements.

The feeding systems and feeding methods previously known also have the drawback that the feed once distributed in the trough will remain there until it has been consumed by the animals. Thus, if some cages of a cage row along which the trough extends for some reason do not contain any animals, the feed in front of these cages will remain until it becomes inferior and have to be removed manually.

The object of the invention is to provide a feeding system and a feeding method for animals which lack said drawback.

SUMMARY OF THE INVENTION

In order to comply with this object the feeding system comprises a feed supply, a device for discharging feed from said supply, a device for supporting and conveying substantially the whole amount of feed so discharged along a path, the feed being accessible to the animals over at least a section of said path, and a device for returning substantially the whole amount of feed remaining on the supporting and conveying device after the passage of said path to the beginning of said path.

Preferably the supporting and conveying device comprises a conveyor belt system.

In an advantageous embodiment of the feeding system this conveyor belt system comprises at least two belt portions conveying the feed and positioned in different horizontal planes and the feeding system comprises a device for transferring the feed from one belt portion to another belt portion positioned in a lower horizontal plane by making the feed fall down from the upper to the lower belt portion.

A feeding system of this kind can be varied in several different ways. The system is cheap to manufacture as the conveyor belts can be manufactured from a cheap belt of synthetical material. The belt is easy to operate and is insensible to dimensional deviations in the system which has made it possible to obviate all drawbacks present in the feeding systems previously known. In a simple and preferred embodiment the feeding system consists of a conveyor belt driven in a trough along a row of poultry cages. The distance between the upper and the lower portion of the belt is small and the belt portions are received in troughs built together. The feed is supplied to the upper belt portion from a supply and forms a feed string on the belt. The belt conveys the feed string along the cage rows, and at the end of the upper belt portion the feed not consumed is transferred to the upper side of the lower belt portion, i.e., to the opposite surface of the belt, whereupon the lower belt portion returns the feed to a point below the supply point to the upper belt portion. Here the feed is transferred from the lower belt portion to a returning device returning the feed not consumed to the feed supply. Preferably the device for transferring the feed from the upper belt portion to the lower belt portion and from the lower belt portion to the returning device consists of means for imparting to the belt an inverted substantially V-shaped cross section making the feed conveyed on the belt fall therefrom and down onto the lower belt portion and into the returning device, respectively.

The method of feeding animals in accordance with the invention comprises the steps of discharging feed from a supply, conveying substantially the whole amount of feed so discharged along a path in such a way that the feed is accessible to the animals over at least a section of said path and returning the whole amount of feed remaining after the passage of said path to the beginning of the path.

It is preferred that the feed is discharged from the supply and is conveyed along the path at a high speed, restraining the animals from eating, that the conveyance of the feed is stopped for allowing the animals to eat and that the remaining feed is returned to the feed supply.

DESCRIPTION OF THE DRAWINGS

The invention is described in the following with reference to the accompanying drawings:

FIG. 1a is a perspective view of a feeding device in accordance with the invention.

FIGS. 1b and 1c are sections respectively, of a conveyor belt with the belt portions positioned in separate troughs.

FIG. 2 schematically shows how two feeding systems of the kind shown in FIG. 1 can be used for building up a system for feeding the animals in two cage rows positioned at different levels.

FIG. 3 schematically shows another embodiment of a feeding system according to the invention.

DESCRIPTION OF THE PREFERRED EMBODIMENT

The embodiment of a feeding system according to the invention shown in FIG. 1 comprises a conveyor belt 2 extending along a row of cages (not shown) containing the poultry to be fed or positioned at the floor in a space wherein the poultry walk around. The belt has an upper portion 4 and a lower portion 6, said portions extending at a relatively small vertical distance from each other. The belt 2 extends around a driving wheel 8, against which the belt is pressed by means of a pressure roller 10 and around a pulley 12 at the opposite end of the system. When the wheel 8 is driven by means of a stub axle 14 which can be connected with a motor or can be driven manually by means of a crank the belt portions 4 and 6 move in the directions shown by means of the arrows. Close by the driving wheel 8 feed, for example granulate, is supplied to the upper belt portion 4 from a feed container 16 which in turn is supplied with feed from a larger container or from any other feeding system through a supply pipe 18. The upper belt portion extends into the containerr 16 at the bottom thereof. At the point where the belt extends into the container there is provided with a sheet metal flange 20 obstructing double feeding of the belt into container and providing for a collecting of the excess of the length of the belt between the driving wheel 8 and flange 20. At the point where the upper belt portion leaves the container 16 the container is formed with a discharge opening 24 controlled by means of a sliding lid 22. Thus, when the upper belt portion 4 leaves the container it supports a feed string controlled by the opening 24 and the lid 22. During the following conveyance of the feed string along the cage rows the poultry can eat from the feed of the feed string. The feed not consumed at the end of the conveyance path of the upper belt portion can be returned into the circulation to be discharged again. In accordance with the invention the feed not consumed is transferred from the upper belt portion 4 to the lower belt portion 6 moving in the opposite direction. The transfer to the lower belt portion is provided by means of a transferring member 26 formed with an inverted V-shaped groove. The belt extends through this groove and is imparted a corresponding cross sectional shape making the feed on the upper belt portion 4 fall down therefrom. As the lower belt portion is positioned below the upper belt portion the feed falling therefrom will fall onto the upper surface of the lower belt portion for being returned in the opposite direction. When the lower belt portion 6 reaches a point below the container 16 the feed on the lower belt portion 6 is made to fall therefrom by means of a member 28 provided with a V-shaped groove of the same kind as the member 26. From the lower belt portion 6 the feed falls down into a collecting channel 30 in which a flexible conveyor screw 32 is positioned. The screw 32 extends into a pipe 34 extending up to a point above the container 16 where the pipe is provided with a discharge slot 36. Thus, the feed not consumed will be returned to the container 16 to be discharged to the upper belt portion 4 again. It can be suitable to connect with the slot 36 a pipe having a cross sectional shape corresponding to the shape of the slot, by means of which the returned feed is led down to the bottom of the container. Thereby the feed already circulated will be conveyed to the belt first of all, therefore eliminating the possibility of old feed.

In FIG. 1a the troughs in which the belt portions extend are not shown . However, sections of these troughs are shown in FIGS. 1b and 1c. The upper trough 40 for the upper belt portion 4 has an upwards open section so that the feed string is accessible to the animals. At its lower surface the trough 40 is formed with the flange portions 42 for supporting a trough 44 for the lower belt portion 6. The upper trough 40 has such a section that the belt is imparted a somewhat arched shape so that the feed string is retained better on the belt. The small feed amounts falling down between the lower surface of the belt and the bottom of the trough have no adverse influence on the functioning but decrease the friction between belt and trough, especially when the feed consists of a granulate. Any accumulation of feed between belt and trough cannot take place, as the feed is successively transported by the lower surface of the belt towards the end portions of the system where the feed falls down. The accumulation is obstructed also by the fact that feed positioned below the belt works itself up onto the belt again, the arched shape of the belt being a reason for this process.

In FIG. 1c there is shown how the upper belt portion is imparted its V-shape so that the feed falls down onto the lower belt portion. Guide members 46 are arranged to guide the feed to the middle of the lower belt portion.

The troughs are manufactured from sections which are connected with each other by means of suitable connector elements. Preferably the connector elements are so formed that only the joints between the side walls of the sections are quite tight while there are formed slots between the sections at the bottom of the trough through which slots feed coming in below the upper belt portion can fall down onto the lower belt portion.

In FIG. 2 there is in principle shown how two feeding systems of the kind shown in FIG. 1 can be built together to serve two cage rows at different levels. In the figure the solid lines represent incoming feed including the point where the pulley 12 is positioned. The broken line represent return conveyance of feed. Thus, the feed comes from a feed pipe into a container of the same kind as the container 16 of FIG. 1. From the container the feed is conveyed by means of a conveyor belt of the same kind as the conveyor belt 2 of FIG. 1. From the lower portion of the belt the feed falls down into a hopper 50 which differs from the embodiment according to FIG. 1 in which the feed falls down into the trough 30 to be returned to the container 16. From the hopper 50 the feed falls down into a container 52 which is supplied also with feed from a larger supply container. From the container 52 the feed is conveyed by means of a conveyor belt of the same kind as the conveyor belt 2 of FIG. 1. From the lower belt portion of the conveyor belt the feed is transferred to a channel of the same kind as the channel 30 according to FIG. 1 to be returned to the container 52 by means of a conveyor screw. Thus, the two systems cooperate in an effective way without any complicated transfer or running the risk of not returning old feed to the circulation.

In FIG. 3 there is shown a feeding system according to the invention in which a conveyor belt 60 is driven in a closed path with relatively great distance between the upper belt portion 62 and the lower belt portion 64. The upper belt portion 62 is adapted to serve an upper cage row while the lower belt portion is adapted to serve a cage row positioned below said upper cage row. The feed is supplied to the uppper belt portion 62 from a container 64, and this supply system which is schematically shown in FIG. 3 can be formed in the same way as according to FIG. 1. At the end of the upper belt portion the belt is guided obliquely downwards and backwards by a pulley 66 making it possible to discharge the feed not consumed to a hopper 68 having a supply pipe for guiding the feed to the upper surface of the lower belt portion 64. The lower belt portion conveys the feed in front of the lower cage row so that the animals in this cage can eat of the feed. At the end of the lower belt portion 64 there is provided a system of substantially the same kind as the system at the lower belt portion in the embodiment of FIG. 1. Thus, the belt is imparted V-shape by means of a member 70 provided with an inverted V-shaped groove so that the remaining feed falls down into a channel 72 from which the feed is transported up through a pipe 74 to the container 64 by means of any kind of conveyor.

It is preferred that the feeding system is operated in a special way. In accordance therewith the conveyor belt 2 and 60, respectively, is driven at a high speed during a conveyance phase of the operation. The high speed of the belt restrains the animals from eating during this phase providing for a rapid, uniform and reliable distribution of the feed in front of the animals. Thereupon, the conveyor belt is stopped allowing the animals to eat during a suitable time. Finally the conveyor belt is again driven for conveying the whole amount of feed not consumed to the device 32, 34 or 72, 74 for returning the feed to the supply. During the returning phase the device for discharging feed from the supply to the conveyor belt can be operative or inoperative. In the first-mentioned case the conveyance phase takes place at the same time as the returning phase, so that the feeding system always contains feed. In the last-mentioned case the conveyance phase and the returning phase are separated, so that the system contains feed only temporarily.

The invention can be modified within the scope of the following claims in many different respects. For example, it is possible to transfer the feed from an upper belt portion to a lower belt portion by scraping the feed from the upper belt portion by means of an inclined scraper or the like. There are also other possibilities of making the feed fall from an upper to a lower belt portion. Also the returning device for returning feed not consumed from the end of the feeding system to the circulation can be designed in different ways. Thus, it is possible to use an elevator system or an inclined bucket wheel.

We claim:

1. A feeding system comprising a feed supply, means for discharging feed from said supply, conveyor means for supporting and conveying substantially the whole amount of feed so discharged along a path, the feed being accessible to the animals over at least a section of the path, said conveyor means including at least two belt portions conveying the feed and positioned in different horizontal planes, and transfer means including an element adapted to impart to the belt an inverted generally V- or U-shaped cross section for transferring the feed from the upper belt portion to a lower belt portion positioned in a lower horizontal plane.

2. A feeding system as claimed in claim 1, in which the upper belt portion extends with the feed accessible to the animals and the lower belt portion extends closely below the upper belt portion with the feed inaccessible to the animals.

3. A feeding system as claimed in claim 1, in which the upper as well as the lower belt portions extend with the feed accessible to the animals.

4. A feeding system as claimed in claim 1, in which the belt is positioned in a trough.

5. A feeding system as claimed in claim 1, in which the bottom of the trough is concave.

6. A feeding system as claimed in claim 1, in which a trough for a lower belt portion is connected with the bottom of the trough for an upper belt portion.

7. A feeding system comprising a feed supply, means for discharging feed from said supply, conveyor means for supporting and conveying substantially the whole amount of feed so discharged along a path, the feed being accessible to the animals over at least a section of the path, said conveyor means including at least two belt portions conveying the feed and positioned in different horizontal planes, and transfer means including an element adapted to impart to the belt an inverted generally V- or U-shaped cross section for transferring the feed from the belt to a collecting means for collecting and returning substantially the whole amount of feed remaining on the belt after the passage of the path to the said feed supply.

8. A feeding system as claimed in claim 7, in which said means for collecting and returning the feed comprises a screw conveyor.

9. A feeding system comprising a feed supply, means for discharging feed from said supply, conveyor means including a flexible belt for supporting and conveying substantially the whole amount of feed so discharged along a path, the feed being accessible to the animals over at least a section of the path, a concave trough for supporting a portion of the flexible belt, said trough having side walls extending above the edges of the belt to retain the feed on said belt, said belt being positioned in said trough so that its bottom surface contacts the lower surface of the trough whereby feed that has fallen down between the belt and the trough will move upwardly in the direction of the edges of the belt and fall back onto the upper surface of said belt, and means for returning substantially the whole amount of feed remaining on the belt after the passage of the path to the feed supply.

* * * * *